United States Patent [19]

Hollander et al.

[11] Patent Number: 5,492,267
[45] Date of Patent: Feb. 20, 1996

[54] METHOD AND APPARATUS FOR LAMINATED HONEYCOMB PACKAGE

[75] Inventors: David S. Hollander, Brooklyn, N.Y.; Mark S. Rubenstein, Edison, N.J.

[73] Assignee: Transtech Service Network, Inc., Rosedale, N.Y.

[21] Appl. No.: 179,764

[22] Filed: Jan. 10, 1994

Related U.S. Application Data

[63] Continuation of Ser. No. 589,458, Sep. 11, 1990, abandoned, which is a continuation of Ser. No. 266,017, Nov. 2, 1988, Pat. No. 5,000,372.

[51] Int. Cl.⁶ ..................................................... B65D 5/56
[52] U.S. Cl. ............... 229/23 R; 220/464; 220/901; 229/3.5 MF; 428/73; 428/118; 493/96; 493/110; 493/966
[58] Field of Search .................. 220/450, 464, 220/901, 415, 441; 217/12 R, 17; 229/23 R, 3.5 R, 3.5 MF, 23 A, 23 C; 428/73, 118; 52/806, 808; 493/84, 95, 96, 110, 966; 206/600

[56] References Cited

U.S. PATENT DOCUMENTS

| | | | |
|---|---|---|---|
| 2,620,119 | 12/1952 | George | 229/33 R |
| 2,766,923 | 10/1956 | D'Esposito | 229/23 C |
| 2,794,588 | 6/1957 | George et al. | 220/415 |
| 2,797,447 | 12/1957 | Winer . | |
| 2,815,795 | 12/1957 | Vander Poe . | |
| 2,833,004 | 5/1958 | Johnson et al. . | |
| 2,887,241 | 5/1959 | MacKenzie | 229/23 C |
| 2,925,210 | 2/1960 | Fallert | 229/23 A |
| 2,932,438 | 4/1960 | Smith | 220/441 |
| 2,954,913 | 10/1960 | Rossman | 220/441 |
| 3,106,503 | 10/1963 | Randall et al. | 428/118 |
| 3,261,533 | 7/1966 | Repking | 229/23 R |
| 3,288,319 | 11/1966 | Cahill | 207/12 R |
| 3,341,102 | 9/1967 | Stephens et al. | 229/3.5 MF |
| 3,391,056 | 12/1964 | Robinson, Jr. . | |
| 3,406,052 | 10/1968 | Peters | 229/DIG. 2 |
| 3,509,005 | 4/1970 | Hartig | 229/3.5 R |
| 3,642,550 | 2/1972 | Doll | 229/3.5 R |
| 3,866,523 | 2/1975 | Geschwender | 493/19 |
| 3,910,485 | 10/1975 | Wandel | 229/3.5 R |
| 3,982,057 | 9/1976 | Briggs et al. | 428/118 |
| 4,029,206 | 6/1977 | Mykleby | 428/73 |
| 4,067,442 | 1/1978 | Howe | 220/441 |
| 4,084,366 | 11/1978 | Saylor et al. . | |
| 4,166,567 | 7/1979 | Beach, Jr. et al. . | |
| 4,194,313 | 6/1980 | Downing . | |
| 4,266,670 | 5/1981 | Mykleby | 220/445 |
| 4,382,106 | 9/1981 | Royster . | |
| 4,434,890 | 3/1984 | Sieck et al. | 229/3.5 MF |
| 4,454,946 | 6/1984 | Yokowo | 206/600 |
| 4,461,796 | 7/1984 | Fukahori et al. . | |
| 4,465,725 | 8/1984 | Riel . | |
| 4,606,461 | 8/1986 | Bolton, Sr. | 206/600 |
| 4,606,959 | 8/1986 | Hillinger | 428/118 |
| 4,691,859 | 5/1986 | Snyder . | |
| 5,000,372 | 3/1991 | Hollander et al. | 229/23 R |
| 5,230,941 | 7/1993 | Hollander et al. | 428/116 |

FOREIGN PATENT DOCUMENTS

| | | |
|---|---|---|
| 490592 | 2/1953 | Canada ................. 229/23 R |
| 948206 | 11/1961 | United Kingdom . |
| 961785 | 6/1963 | United Kingdom . |
| 2155168 | 6/1984 | United Kingdom . |
| 2173447 | 3/1985 | United Kingdom . |
| 2197820 | 11/1986 | United Kingdom . |

OTHER PUBLICATIONS

"Honeycombed Package Security" *Air Transportation* pp. 27–28, Mar. 1965.
"Distribution Packaging" by Friedman & Kipnees, pp. 117–119 (1977).

*Primary Examiner*—Gary E. Elkins
*Attorney, Agent, or Firm*—Kane, Dalsimer, Sullivan, Kurucz, Levy, Eisele & Richard

[57] ABSTRACT

A package for preserving perishable food products such as produced shipped in large quantities on a pallet wherein the invention includes panels formed of honeycomb material covered by aluminum foil panels to provide a stronger and better insulated package.

26 Claims, 4 Drawing Sheets

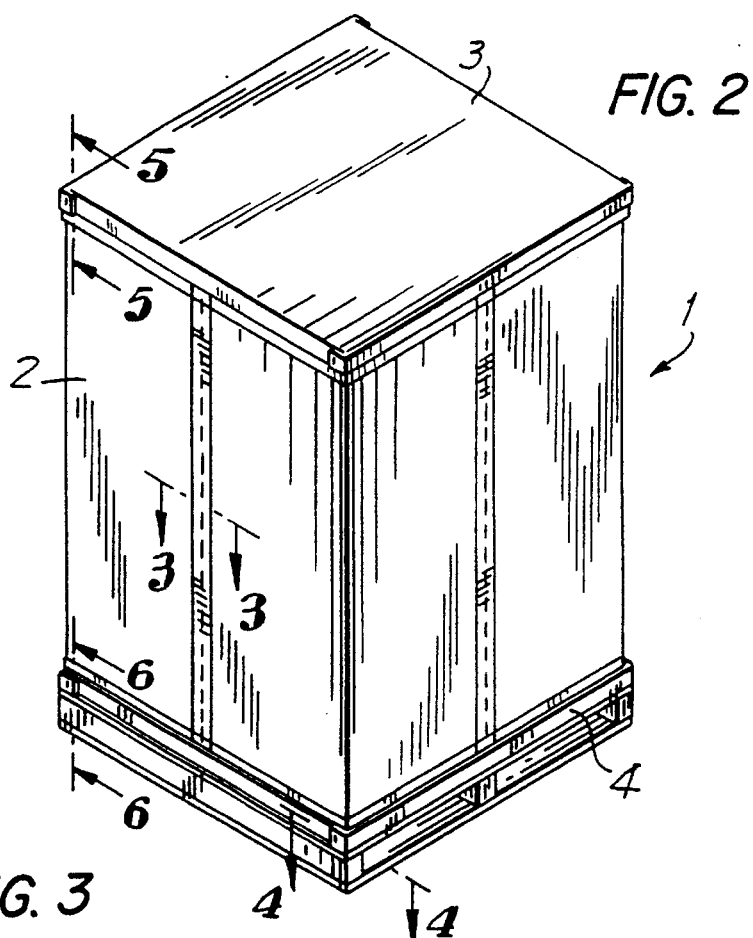
FIG. 2
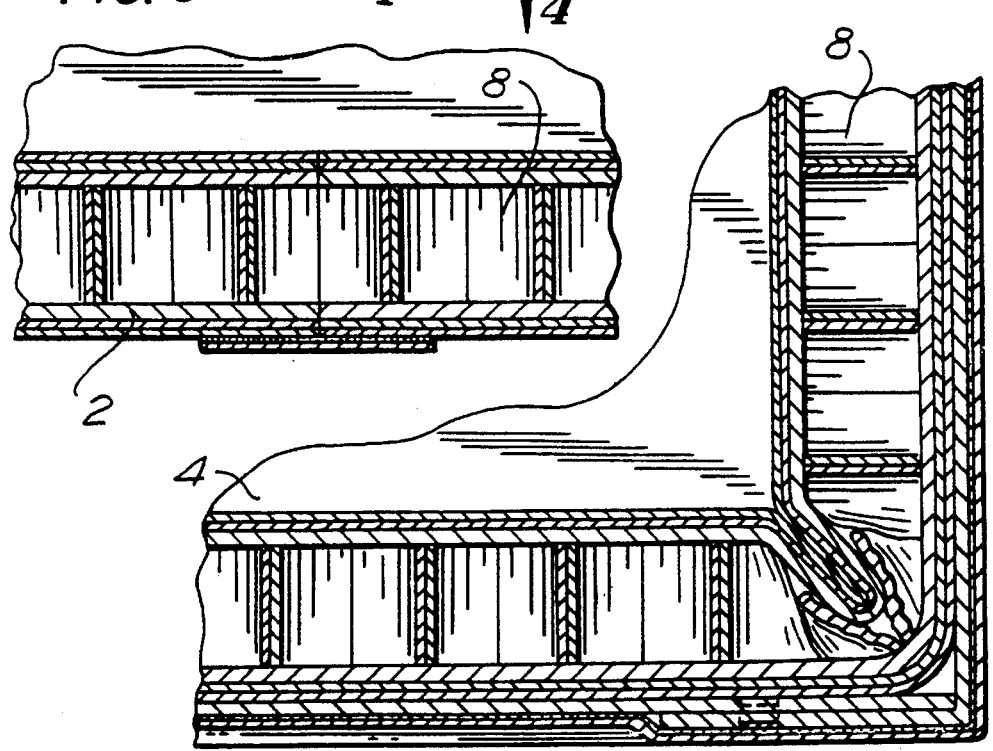
FIG. 3
FIG. 4

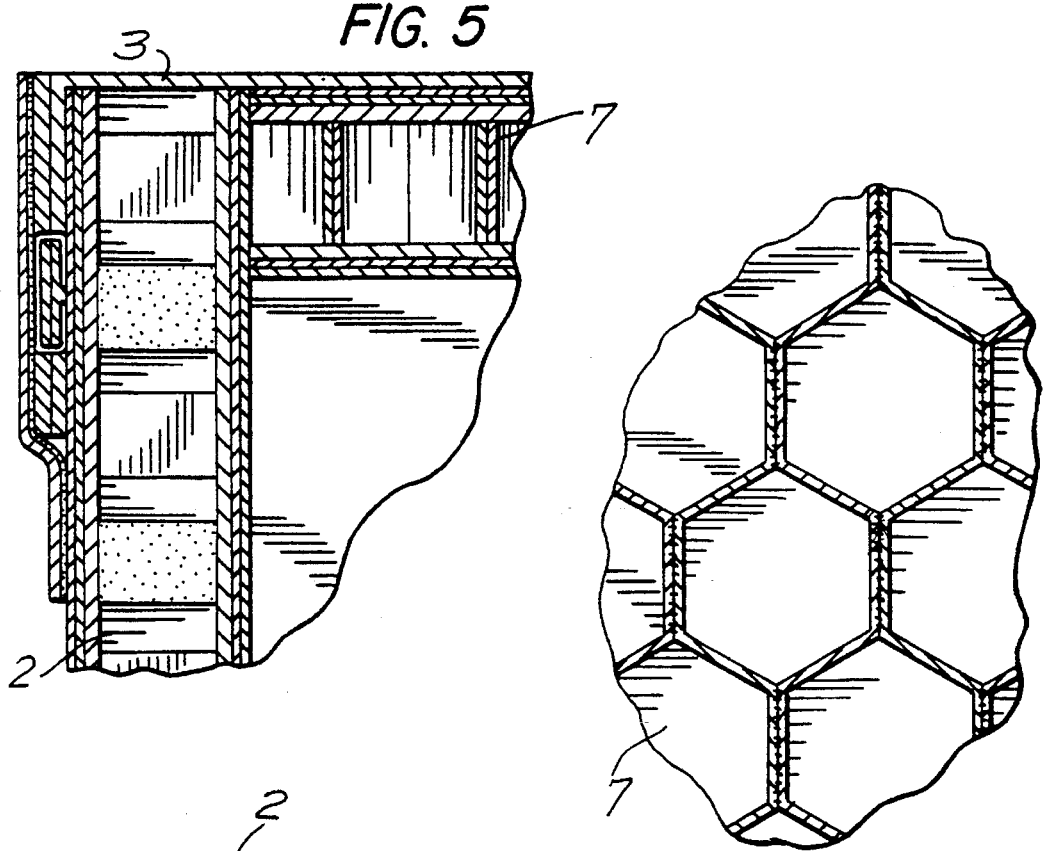
FIG. 5
FIG. 7
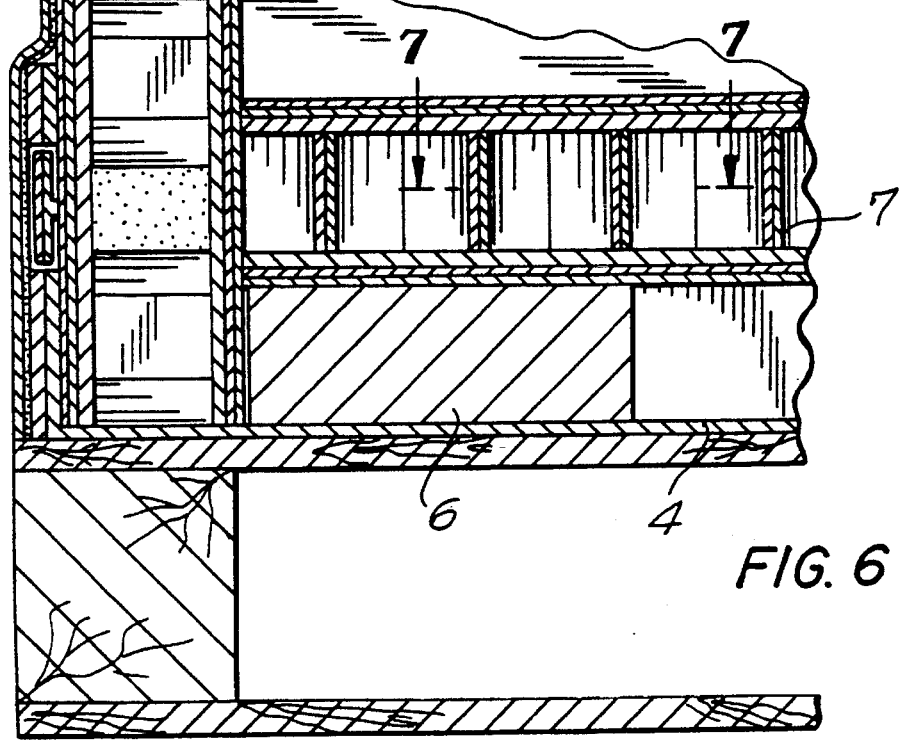
FIG. 6

METHOD AND APPARATUS FOR LAMINATED HONEYCOMB PACKAGE

This application is a continuation of application Ser. No. 07/589,458, filed Sep. 11, 1990, now abandoned, which is a continuation of application Ser. No. 07/266,017 filed on Nov. 2, 1988, now U.S. Pat. No. 5,000,372.

FIELD OF THE INVENTION

The present invention relates to a method and apparatus for packaging perishable goods and other temperature sensitive products and particularly large quantities of such goods which are supported and protected on a pallet and shipped primarily by air freight. In particular the invention relates to a novel method and apparatus for foil laminated honeycomb material packages for packaging perishable goods and other temperature sensitive products.

Some commodities which require and for which the present invention provides cost effective protection against extremes in hot and cold temperatures include fresh fruits, vegetables, horticultural products; fresh and frozen meats, poultry and seafood; dairy products and eggs; frozen prepared foods, fresh juices and frozen concentrates; chemicals, drugs and biological products; candies and confections; and temperature sensitive paper products.

BACKGROUND OF THE INVENTION

Over the last decade there has been dramatically increased growth and interest in the movement of edible perishables by air, not only in the U.S. but worldwide. The World Air Cargo Industry flew an estimated 6 billion pounds of seafood and 19 billion pounds of produce in 1985. Distant access to fresh products for health, taste, and off-season supply are driving forces in the current import/export growth in many countries and will fuel even greater growth of the future.

Fresh edibles marketing has matured more rapidly than the specialized transport structure needed to provide distribution high product quality control. Specialized packaging is either non-existent or woefully inadequate. This unsatisfactory environment creates waste, disenchantment and/or health risk and it works toward destroying markets.

The University of California at Davis estimates that 25% of the world's produce is never eaten, because of inefficient transportation systems between the source and the consumer that results in total loss.

Internally generated research has shown that after a 12 hour air transit cycle, the average product transported in a standard produce pallet as belly freight and inserted at 33 degrees F.—arrived with a core pulp temperature of 63 degrees F. In passenger aircraft, the atmospherics of the cargo areas of the belly consist of recirculated cabin air heated to 72 degrees F. with a very dry relative humidity of 2 percent. This produces a very hostile transportation environment for perishable products, where with increases of heat by degree increments, shelf life diminishes "exponentially".

It is therefore desirable to provide longer term insulation protection for temperature sensitive products to shield them from outside influences of heat and cold during shipping. It is also desirable to provide an inexpensive, improvedly strengthened container which has proved insulation protection against the aforementioned adverse conditions.

SUMMARY OF THE INVENTION

Hence with the foregoing in mind it is a principal object of the invention to provide an apparatus for packaging edible perishable goods and other temperature sensitive products in strong, insulated, lightweight containers.

It is a further method to provide a method for making such containers.

In order to implement these and other objects of the invention, which will become more readily apparent as the description proceeds, the present invention provides a method and apparatus for packaging perishable goods wherein the packaging material is formed of insulating surfaces. Further the packaging is preferably formed of panels each having low emissivity, highly reflective grade aluminum foil on its outer surfaces laminated to kraft paper. The foil laminate is then adhered to an additional kraft bonded perpendicular to the honeycomb type material sandwiched between the layers of kraft paper and aluminum foil. The kraft paper helps bond the aluminum foil to the outer surfaces of the kraft perpendicular to the honeycomb material.

BRIEF DESCRIPTION OF THE DRAWINGS

For a fuller understanding of the nature and the objects of the invention, reference should be had to the following detailed description, taken in connection with the accompanying drawings, in which:

FIG. 2 is an assembled perspective view of the embodiment shown in FIG. 1;

FIG. 3 is a partial sectional view taken along the lines 3—3 as shown in FIG.2;

FIG. 4 is a partial sectional view taken along the lines 4—4 as shown in FIG. 2;

FIG. 5 is a partial sectional view taken along the lines 5—5 of FIG. 2;

FIG. 6 is a partial sectional view taken along the lines 6—6 of FIG. 2; and

FIG. 7 is a partial cross sectional view taken along the lines 7—7 of FIG. 6.

DETAILED DESCRIPTION OF THE PREFERRED EMBODIMENTS

Figure 1:
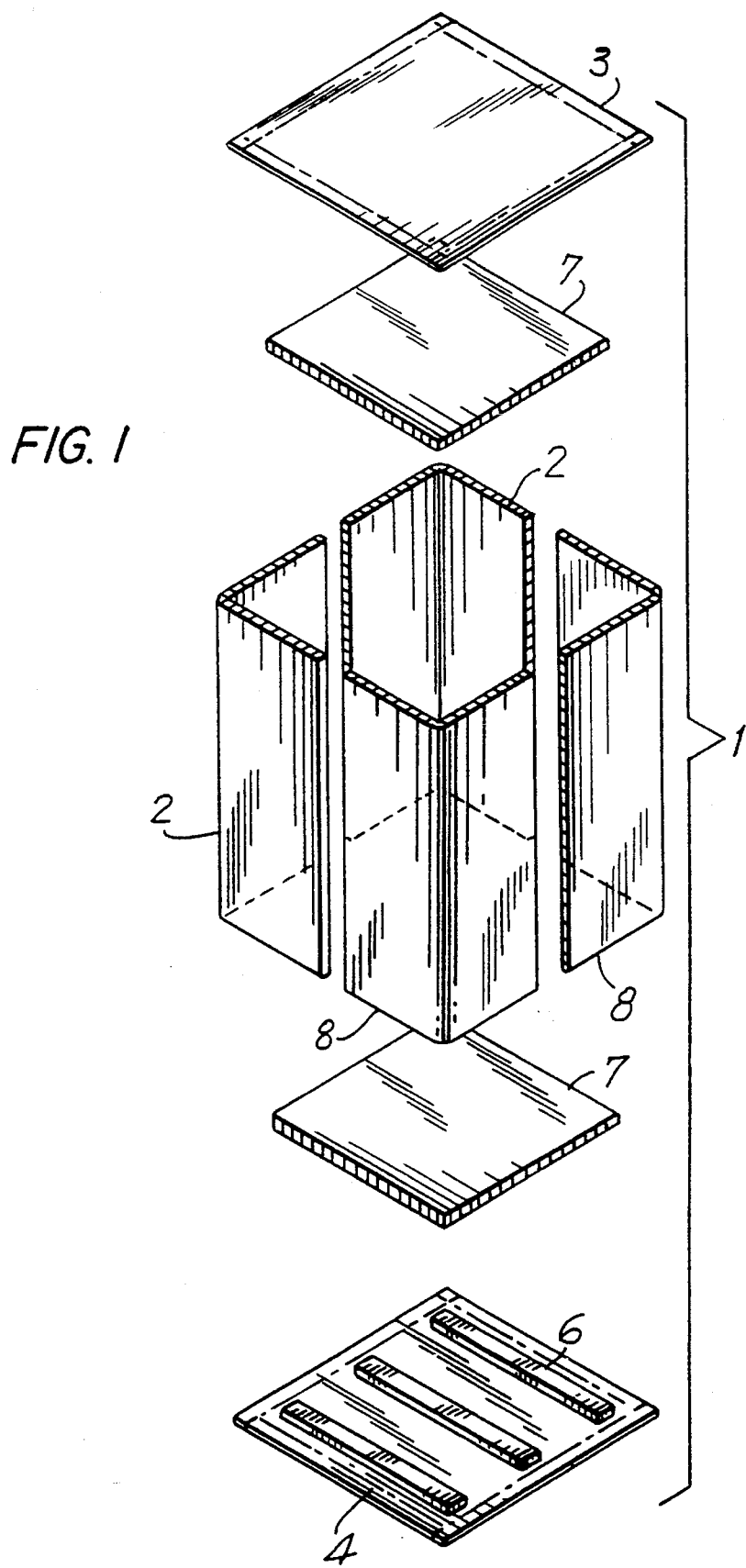
FIG. 1 is an exploded perspective view of an embodiment of the present invention.

Referring now to the drawings, FIG. 1 shows an exploded perspective view of an embodiment of the present invention. The package 1 is preferably constructed of 4 sidewalls 2 and top and bottom caps 3,4, respectively.

The top cap 3 and the bottom cap 4 are each formed of water resistant corrugated material or any other suitable material known in the industry, which retards erosion by moisture each having spacers 6, which maybe made of honeycomb material or other suitable material, disposed on the interior surface of the package 1. Honeycomb material can be obtained from the International Honeycomb Corporation, University Park, Ill. Honeycomb material is made from kraft paper sheets and has a grid of hexagonal cells (see FIG. 7) which when bonded between two kraft paper sheets provides for a highly crush resistant structure due to the evenly spaced, perpendicularly disposed rigid walls of each honeycomb cell. Alternatively, any other type of material evenly spaced, perpendicularly disposed rigid walls of each honeycomb cell. Alternatively, any other type of material having a lattice structure and/or geometrically patterned structure which provides enhanced strength for supporting and protecting heavy loads of produce and which creates air space as a result of that structure can be used. The air space formed between the kraft layers creates an enhanced insulating effect in conjunction with the layers of foil laminated to both sides of the kraft paper. The significance of the air space is that air is a poor conductor of heat and thus has valuable insulation properties in such packaging applications as evidenced by applicants' copending patent application Ser. No. 203,943 filed on Jun. 8, 1988.

Any reference to aluminum foil panels such as foil panels 7 and 8 in fact represents a panel of honeycomb material (FIG. 5) laminated on both sides by aluminum foil.

Bonding may be accomplished by known conventional means such as by gluing or by pressure sensitive masking. The kraft paper helps to strengthen the insulating material by placing it perpendicular to the rigid honeycomb core walls, thereby ensuring an even distribution of weight over the honeycomb structure. In addition to the air pocket created by the honey comb it provides superior structural integrity to such oversized containers as palletized freight as well as better thermal insulation for the packaged product. Further, the low emissivity, high grade reflectivity of the aluminum foil increases the thermal insulative attributes of the package 1 as was noted in the aforementioned patent application Ser. No. 203,943.

Thus the properties of the combination of aluminum and air insulating material greatly increases the insulation of goods packaged within package 1 while still providing a low weight package which is highly cost efficient for shipping purposes.

The top cap 3 is formed in a similar fashion to the bottom cap 4 with the interior surfaces having runners disposed face down in the package 1. Foil panels 7 are placed and/or bonded to the interior of the top cap 3 and the bottom cap 4.

Each sidewall 2 is preferably formed of two adjoining foil panels 8 having a corner therebetween which has been crush scored as shown in FIGS.1 and 4.

The foregoing description of the assemblage of the package provides preferred dimensions, however it is understood that the invention is not limited to these specific dimensions.

The package has inner dimensions of 40"×48"×54" and outer dimensions of 42"×50"×58". The bottom cap 4 has 3 spacers each ¼" thick on its interior surface. The bottom cap is placed on the pallet with the spacers face up. The bottom cap 4 when folded during construction defines 1" channels into which the sidewalls 2 can be inserted for snug and secure placement. The foil panel 7 is placed on top of the spacers. The foil panel 7 having dimensions of 40"×48" when aligned and placed on top of the bottom panel 4 so that a 1" channel is created between the foil panel and the cap walls as seen in FIG. 1. The cap walls are assembled by folding at the score upwardly and placing the flap end of one side in front of the other and then either stapling or taping them into place. Die cut self locking mechanisms may be created at the request of the user to facilitate cap construction without the aid of staple machinery or tapes. The top cap 3 is constructed in the same manner as the bottom cap 4 with the spacers disposed face down into the package 1 and with similar channels created to accommodate the sidewalls therein. The side seams on each side of the package which exists between two of the sidewalls 2 is preferably sealed with 4" wide aluminum tape or else with any other tape or bonding means that is known.

Figure 8:
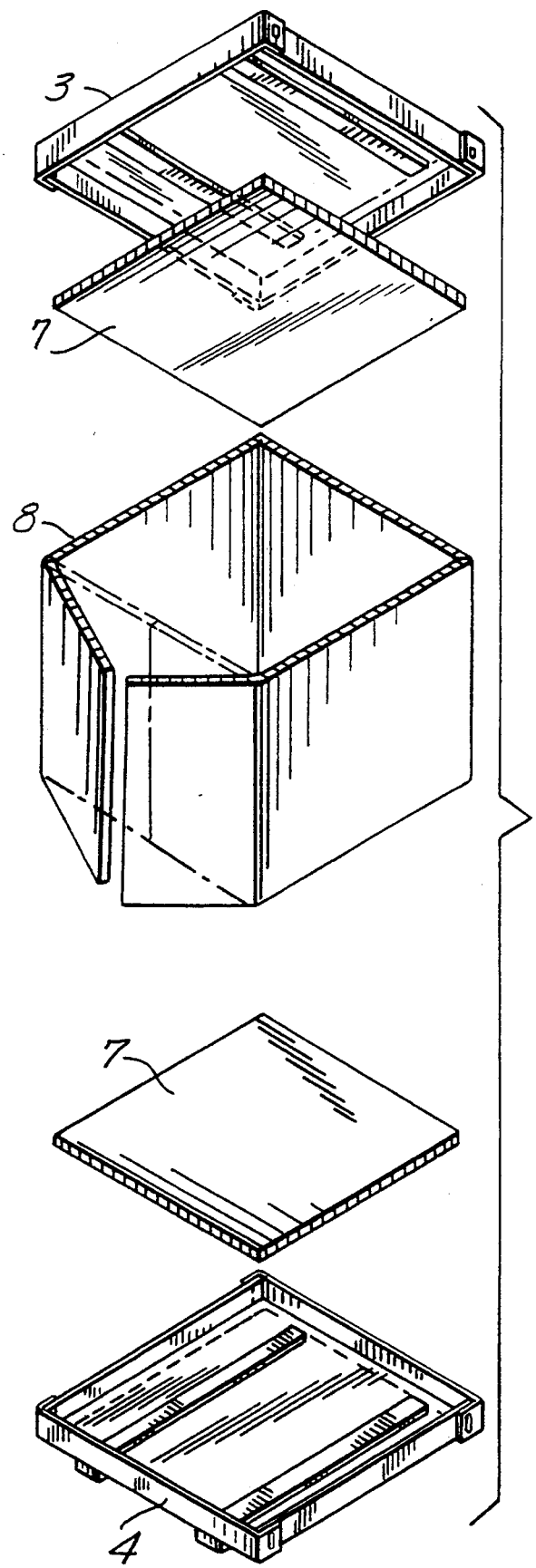
FIG. 8 is an exploded perspective view of another embodiment of the present invention.

Referring now to FIG. 8, FIG. 8 shows an alternate embodiment of the instant invention which is similar to the embodiment of FIGS. 1–7 except that it provides for a package 1 that includes a sidewall configuration formed of a single foil panel 8 crush scored in four places to form the edges of the package 1. The placement or spacing of the scores will be determined by designating the container size or by specific dimensions.

Top and bottom caps 3 and 4 and foil panels 7 are the same as described in FIG.1 except that it is preferable to provide each with two spacers on the respective interior surfaces of top and bottom caps 3 and 4. Channels are again provided by folding on the scores as described in the embodiment of FIG. 1 so as to accommodate sidewalls 2 therein. Aluminum tape or any plastic stripping or other bonding means can be used to seal the side seam of the fourth sidewall. The preferred dimensions for package 1 of FIG. 8 are: width: 32¾", depth:28" and height: 25½". As can be seen, as the size of the embodiment decreases the foil panels decrease as well resulting in only one separation requiring aluminum tape or other bonding means. The corners are preferably crush scored as described in the embodiment of FIG. 1. Accordingly it is understood that the instant invention is not limited to the aforementioned configurations as various alternative constructions are possible based upon dimension constraints in accordance with the teaching of the instant invention.

We do not limit ourselves to any particular details or constructions set forth in this specification and illustrated in the accompanying drawings as the same refers to and sets forth only certain embodiments of the invention, and it is observed that the same may be modified without departing from the spirit and scope of the invention.

Having thus described the invention, what we claim as new and desire to be secured by Letters Patent is as follows:

1. A collapsible shipping carton comprising:
   a plurality of generally rectangular panels, each panel being connected to at least one adjacent panel by hinge means whereby each panel can be positioned at a right angle to the adjacent panel, the panels forming a sidewall having an open top portion and an open bottom portion, each panel including an interior surface, an exterior surface and a filler portion therebetween, the interior and exterior surfaces including a layer of metal foil, the filler portion of the panels being a honeycomb-type insulating material; and
   an upper support tray and a lower base tray each including a panel member having an inside surface and side* members which extend from the inside surface whereby the upper support tray receives the top portion of the sidewall and the lower base tray receives the bottom portion of the sidewall to enclose the sidewall.

2. The shipping carton according to claim 1 including a base panel removably associated with the inside surface of the lower base tray.

3. The shipping carton according to claim 1 including an upper lid panel removably associated with the inside surface of the upper support tray.

4. The shipping carton according to claim 2 wherein one of the trays includes a plurality of spaced-apart inserts, each insert having a first surface associated with the inside surface of the lower base tray and a second surface associated with the base panel.

5. The shipping carton according to claim 1 wherein the channel is at least as thick as the sidewall.

6. The shipping carton according to claim 4 wherein both the upper tray and lower tray have said inserts, each insert of the base tray is separated from certain of the side members of the base tray to define a channel adapted to receive the sidewall.

7. The shipping carton according to claim 6 wherein the channel is at least as thick as the sidewall.

8. The shipping carton according to claim 1 including means for securing the panels and the trays together.

9. The shipping carton according to claim 8 wherein the securing means includes the hinge means for connecting the adjacent panels together.

10. The shipping carton according to claim 1 wherein the trays comprise board.

11. The invention in accordance with claim 1 wherein an upper lid panel rests on the top portion of the sidewall and a lower base panel fitting within the bottom portion of the sidewall; and the upper tray having an inside surface and side flaps extending from the upper tray whereby the upper tray receiving the lid panel and the top portion of the sidewall; and the lower base tray having an inside surface and side flaps extending outwardly from the lower tray whereby the lower base tray receives the lower base panel and the lower portion of the sidewall.

12. The invention in accordance with claim 1 wherein the sidewall is the same size to facilitate assembly of the carton.

13. A shipping carton comprising:
   a) a lower base tray containing a lower base panel member and having an inside surface and a plurality of side flaps that extend from the tray;
   b) a plurality of generally rectangular panels, each panel being connected to an adjacent panel, the panels forming a sidewall having a top portion and a bottom portion, the bottom portion being adapted to be received within the lower base tray;
   c) an upper support tray comprising an upper panel member having an inside surface and a plurality of upper side members that extend from the inside surface whereby the upper support tray is adapted to receive the top portion of the sidewall; and
   d) the sidewall panels and the lower tray and upper tray including an interior surface, an exterior surface and a filler portion therebetween, the interior and exterior surfaces including a layer of metal foil, the filler portion being a honeycomb-type insulating material.

14. The shipping carton according to claim 13 including a base panel associated with the inside surface of one of the trays.

15. The shipping carton according to claim 13 including a panel associated with the inside surface of the upper support tray.

16. The shipping carton according to claim 14 wherein the one of the trays includes a plurality of spaced-apart inserts, each inset having a first surface associated with the inside surface of the lower tray and a second surface associated with the base panel associated with the lower base tray.

17. The shipping carton according to claim 16 wherein the base panel is smaller than the lower base tray in dimensions of length and width.

18. The shipping carton according to claim 17 wherein the channel is at least as thick as the sidewall.

19. A method of forming a shipping carton having sidewalls comprising the steps of:

providing a plurality of generally rectangular sidewall panels forming the sidewalls of the carton, each sidewall panel having a bottom portion and a top portion and being connected to at least one adjacent panel by hinge means;

providing a lower base tray with hinged flaps extending from the tray, and containing a lower base panel member, with each flap corresponding to the bottom portion of each sidewall panel;

bending each generally rectangular panel at a right angle across the hinge means and arranging them to fit within the base tray to form the sidewalls;

providing an upper lid tray with hinged flaps extending from the tray and containing an upper lid panel to lay on top of the sidewalls, with each flap of the upper tray corresponding to the top portion of each sidewall panel to cover the sidewalls and form the shipping carton;

securing the trays and panels together;

each panel having opposing sides and being formed from honeycomb insulating material having aluminum foil on its sides.

20. A shipping carton comprising:

a plurality of generally rectangular adjacent panels, each panel being connected to at least one of the adjacent panels by hinge means, the panels being adapted to be expanded to form a sidewall having an open top portion and an open bottom portion;

an upper support tray and a lower base tray, each tray including a panel member having an inside surface and side members which extend from the inside surface whereby the lower base tray receives the bottom portion of the sidewall and the upper support tray receives the top portion of the side wall to form the shipping carton;

whereby the panels can be folded at the hinge means; and the sidewall panels and the lower base tray and upper support tray including an interior surface, an exterior surface and a filler portion therebetween, the interior and exterior surfaces including a layer of metal foil, the filer portion being a honeycomb-type insulating material.

21. The shipping carton according to claim 20 including a liner member associated with the inside surface of one of the trays.

22. The shipping carton according to claim 20 wherein one of the trays include a plurality of spaced-apart inserts and a liner member, each insert having a first surface associated with the inside surface of the lower tray and a second surface associated with the liner member.

23. The shipping carton according to claim 22 wherein at least one insert of one of the trays is separated from the side members of said one of the trays to define a channel.

24. The shipping carton according to claim 23 wherein the channel is at least as thick as the sidewall.

25. The shipping carton according to claim 20 including means for securing the shipping carton together.

26. A shipping carton comprising:
   a) a lower base tray including a lower panel member having an inside surface and a plurality of lower side members that extend from the inside surface, the lower base tray including a plurality of spaced-apart inserts, each insert having a first surface associated with the inside surface of the lower base tray and a second surface;
   b) a plurality of generally rectangular adjacent panels, each panel being connected to one of the adjacent panels, the panels forming a sidewall having a top portion and a bottom portion, the bottom portion being adapted to be received within the lower base tray;
   c) an upper support tray comprising an upper panel member having an inside surface and a plurality of upper side members that extend form the inside surface of the upper tray whereby the upper support tray is adapted to receive the top portion of the sidewall, the upper support tray including a plurality of spaced-apart inserts; and d) the sidewall panels and the lower base tray and upper support tray including an interior surface, an exterior surface and a filler portion therebetween, the interior and exterior surfaces including a layer of metal foil, the filler portion being a honeycomb-type insulating material.

* * * * *